United States Patent [19]
Takeuchi

[11] Patent Number: 5,928,336
[45] Date of Patent: Jul. 27, 1999

[54] PC CARD AND PERIPHERAL DEVICE

[75] Inventor: Atsuya Takeuchi, Yokohama, Japan

[73] Assignee: International Business Machines Corporation, Armonk, N.Y.

[21] Appl. No.: 08/856,567

[22] Filed: May 15, 1997

[30] Foreign Application Priority Data

Jul. 15, 1996 [JP] Japan ..................................... 8-184338

[51] Int. Cl.$^6$ .................................................. G06F 13/00
[52] U.S. Cl. ................................... 710/1; 710/8; 710/15; 710/62; 365/52
[58] Field of Search ..................................... 395/821, 846, 395/750.05, 184.01, 800.39, 750.01, 750.03, 500, 828, 835, 882; 380/20; 365/52

[56] References Cited

U.S. PATENT DOCUMENTS

| | | | |
|---|---|---|---|
| 5,546,590 | 8/1996 | Pierce ....................................... | 395/750 |
| 5,572,478 | 11/1996 | Sato et al. ................................ | 365/226 |
| 5,671,368 | 9/1997 | Chan et al. ............................... | 395/282 |
| 5,671,374 | 9/1997 | Postman et al. ......................... | 395/309 |
| 5,724,544 | 3/1998 | Nishi ........................................ | 395/442 |
| 5,845,139 | 12/1998 | Fischer et al. ...................... | 395/750.06 |

*Primary Examiner*—Hassan Kizou
*Assistant Examiner*—Abu Hossain
*Attorney, Agent, or Firm*—Bernard D. Bogdon; Daniel E. McConnell

[57] ABSTRACT

Provided is a PC card and peripheral device having a non-volatile memory device that can perform erasing and re-writing at a relatively high operational voltage, and an internal circuit that is driven at a relatively low voltage, and is accomplished by a typical PC card that comprises: (a) an EEPROM serving as a non-volatile memory device; (b) a built-in battery having a low voltage output that supports the reading of the EEPROM but does not support erasing and re-writing; (c) a power line for conveying from a host computer system the high voltage required for erasing and re-writing the EEPROM; (d) an MPU that can be driven by a voltage supplied by the built-in battery; (e) an interface circuit that can be driven at a voltage supplied by the built-in battery; and (f) a switching circuit for selecting either the built-in battery or the power line as the power supply for the EEPROM. When the host computer system or the PC card access the EEPROM to read data, the switching circuit selects the built-in battery as the power source for the EEPROM. Then, an operational voltage that is adequate only for reading is supplied to the EEPROM. When the computer system accesses the EEPROM to write data, the switching circuit selects as the power source for the EEPROM the power line that conveys a high voltage. Therefore, the writing of data in the EEPROM can be performed.

15 Claims, 3 Drawing Sheets

PC CARD AND PERIPHERAL DEVICE

FIELD OF THE INVENTION

The present invention relates to PC cards and peripheral devices that can be inserted into a host computer system, and in particular to PC cards and peripheral devices that can be inserted into a host computer system and that can be driven by a built-in battery and can serve as a stand-alone apparatus. More specifically, the present invention pertains to PC cards and peripheral devices that have a non-volatile memory device erasable and re-writable at a relatively high operational voltage, and an internal circuit that is driven at a relatively low voltage.

DESCRIPTION OF THE BACKGROUND

Along with recent advances in technology, various types of semiconductor memory devices have been developed and manufactured. An EEPROM (electrically erasable and programmable ROM) is a read only memory that can be electrically erased and re-written. The EEPROM is non-volatile and is mainly used, for permanently and re-writably storing data or programs, into the computer system. An EEPROM is used to store, for example, a BIOS (Basic Input/Output System), system configuration information (device types and counts, allocation of an I/O address, the main memory size, etc.), and a password. For a PC card, the EEPROM is used to store card attribute information called "tuple." A tuple, according to the PC card standardized specification prescribed by PCMCIA/JEIDA, is card attribute information, stored within itself and includes configurations, manufacturer, and individual characteristics, such as size, speed, and programming information. Tuple is stored in a non-volatile memory in a card.

An EEPROM requires a higher voltage for erasing and writing than for reading. Generally, therefore, a booster circuit is incorporated in an EEPROM. At the time reading is performed, the EEPROM is operated at a relatively low operational voltage, e.g., 3V, that is externally supplied. At the time erasing and writing is performed, the booster circuit raises an externally supplied, relatively high operational voltage, e.g., 5V, to a voltage of 9V to 12V, for example, and the EEPROM is driven at that voltage.

PC cards, that is a type of peripheral devices which has the size of a credit card, were originally developed to compensate for the limited expansion available with a personal computer (PC). The mechanical and electrical specifications for PC cards are determined mainly by the PCMCIA (Personal Computer Memory Card Interface Association) and the JEIDA (Japan Electronic Industry Development Association). At present, various types of PC cards are available, such as memory cards, flash memory cards, HDD cards, FAX/modem cars, and Ethernet cards.

Conventionally, it is premised that PC cards should be inserted into a PC, regardless of the memory card type or the I/O card type. A commercially available power source providing an inexhaustible power supply, or a battery pack having a relatively large capacity, is used as main power supply for the PC. A PC card that is employed only when it is inserted into a PC need only receive power from the PC main body. Therefore, in accordance with the voltage supplied by the PC main body, the internal circuit of the PC card is normally designed to operate at a relatively high operational voltage of 5V.

Recently, however, PC cards have been produced that incorporate a CPU and a coin battery, and that can be self-driven, i.e., can operate as stand-alone apparatus, even when not inserted into a PC. For example, the PC cards "ChipCard TC-100" and "ChipCard VW-200", which are sold by IBM Japan, Ltd., are stand-alone type PC cards. TC-100 and VW-200 serve as memory cards when inserted into a PC. When TC-100 and VW-200 operate as stand-alone apparatuses, they serve as electronic notebooks driven by a built-in coin battery, and are used to view data (e.g., personal information for a calendar, schedule management and telephone numbers) downloaded from a host PC.

Since such type of stand-alone PC card is coin-battery operated, the power capacity of the PC card is limited. Taking power consumption into account, it is preferable that the internal circuit of the PC card be designed to operate at an operational voltage lower than the conventional one, 3V, for example. However, if the circuit is designed for a low operational voltage, a problem arises concerning the erasing and writing operations for the EEPROM in the PC card. As was described above, most currently available EEPROMs perform reading operation at a supplied voltage of 3V, but internally raise a supplied voltage of 5V to 12V in order to perform erasing and re-writing operation. As a supplied voltage of 3V disables erasing and re-writing of an EEPROM, very few EEPROMs support erasing and writing at 3V. But, since the operational voltage boosting ratio for such products is very high, they do consume more power. Up to now, it has not been feasible to employ a 3V internal circuit when designing a PC card that incorporates an EEPROM.

To resolve the above shortcomings, it is one objective of the present invention to provide an enhanced PC card and peripheral device that can be inserted into a host computer system, and that can also function as an improved stand-alone apparatus by employing a built-in battery.

SUMMARY OF THE INVENTION

It is another objective of the present invention to provide an enhanced PC card and peripheral device having a non-volatile memory device that can perform improved erasing and re-writing operations at a relatively high operational voltage, and an internal circuit driven at a relatively low voltage.

The present invention is based on the empirical rule that even for a stand alone PC card, the erasing and the re-writing of its internal EEPROM are generally performed by a PC when the PC card is inserted into the PC, and the PC card accesses the EEPROM only for reading, i.e., the PC card does not access its EEPROM for writing when it is functioning as a stand-alone apparatus.

According to a first aspect of the present invention, a PC card/peripheral device, which can be inserted into a host computer system, comprises: (a) a non-volatile memory device that can be read at a first operational voltage and that can be erased and re-written at a second operational voltage higher than the first operational voltage; (b) a built-in battery for providing the first operational voltage; (c) a power line for conveying the second operational voltage supplied by the host computer system; (d) an internal circuit that is driven at the first operational voltage provided by the built-in battery; and (e) a switching circuit for connecting either an output terminal of the built-in battery or the power line to the non-volatile memory device in response to a read access or an erase/re-write access.

According to a second aspect of the present invention, a PC card/peripheral device, which can be inserted into a host computer system, comprises: (a) a non-volatile memory device that can be read at a first operational voltage and can be erased and re-written at a second operational voltage higher than the first operational voltage; (b) a built-in battery for providing the first operational voltage; (c) a power line for conveying the second operational voltage supplied by the host computer system; (d) an MPU for controlling the internal operation of the PC card/peripheral device, the MPU being driven at the first operational voltage provided by the built-in battery; (e) an interface circuit for performing an interface protocol with the host computer system, the interface circuit being driven at the first operational voltage supplied by the built-in battery; and (f) a switching circuit for connecting either an output terminal of the built-in battery or the power line to the non-volatile memory device in response to a read access or an erase/re-write access.

According to a third aspect of the present invention, a PC card/peripheral device, which can be inserted into a host computer system, comprises: (a) a non-volatile memory device that can be read at a first operational voltage and can be erased and re-written at a second operational voltage higher than the first operational voltage; (b) a built-in battery for providing the first operational voltage; (c) a power line for conveying the second operational voltage supplied by the host computer system; (d) an MPU for controlling the internal operation of the PC card/peripheral device, the MPU being driven at the first operational voltage supplied by the built-in battery; (e) an interface circuit that is driven at the first operational voltage supplied by the built-in battery and that includes an internal register to which I/O access by the host computer system is enabled; and (f) a switching circuit for connecting either an output terminal of the built-in battery or the power line to the non-volatile memory device in accordance with a set value for predetermined bits in the internal register.

According to a fourth aspect of the present invention, a PC card/peripheral device, which can be inserted into a host computer system, comprises: (a) a non-volatile memory device that can be read at a first operational voltage and can be erased and re-written at a second operational voltage higher than the first operational voltage; (b) a built-in battery for providing the first operational voltage; (c) a power line for conveying the second operational voltage supplied by the host computer system; (d) an MPU for controlling the internal operation of the PC card/peripheral device, the MPU being driven at the first operational voltage supplied by the built-in battery; (e) an interface circuit for performing an interface protocol with the host computer system, the interface circuit being driven at the first operational voltage supplied by the built-in battery; (f) a switching circuit for connecting either an output terminal of the built-in battery or the power line to the non-volatile memory device; and (g) instruction means for specifying whether reading or writing to the non-volatile memory device is currently performed by the non-volatile memory device; and (h) switching means for operating the switching circuit in accordance with an instruction received from the instruction means.

According to a fifth aspect of the present invention, a PC card/peripheral device, which can be inserted into a host computer system, comprises: (a) a non-volatile memory device that can be read at a first operational voltage and can be erased and re-written at a second operational voltage higher than the first operational voltage; (b) a built-in battery for providing the first operational voltage; (c) a power line for conveying the second operational voltage supplied by the host computer system; (d) an internal digital circuit that is driven at the first operational voltage supplied by the built-in battery; (e) an internal analog circuit that is driven at the first operational voltage supplied by the built-in battery; and (f) a switching circuit for connecting either an output line for the built-in battery or the power line to the non-volatile memory device in response to a read access or an erase and a write access.

According to a sixth aspect of the present invention, a PC card/peripheral device, which can be inserted into a host computer system, comprises: (a) a non-volatile memory device that can be read at a first operational voltage and that can be erased and re-written at a second operational voltage higher than the first operational voltage; (b) a built-in battery for providing the first operational voltage; (C) a power line for conveying the second operational voltage supplied by the host computer system; (d) a digital MPU for controlling the internal operation of the PC card/peripheral device, the MPU being driven at the first operational voltage supplied by the built-in battery; (e) a digital interface circuit for performing an interface protocol with the host computer system, the digital interface circuit being driven at the first operational voltage supplied by the built-in battery; (f) an analog reception circuit for performing radio communication with an external apparatus other than the host computer system, the analog reception circuit being driven at the first operational voltage supplied by the built-in battery; and (g) a switching circuit for connecting either an output line for the built-in battery or the power line to the non-volatile memory device in response to a read access or an erase and a write access.

A typical PC card that embodies the present invention comprises: (a) an EEPROM serving as a non-volatile memory device; (b) a built-in battery having a low voltage output that supports the reading operation of the EEPROM but does not support erasing and re-writing operation; (c) a power line for conveying from a host computer system the high voltage required for erasing and re-writing the EEPROM; (d) an MPU that can be driven by a voltage supplied by the built-in battery; (e) an interface circuit that can be driven at a voltage supplied by the built-in battery; and (f) a switching circuit for selecting either the built-in battery or the power line as the power supply for the EEPROM.

In the PC card, when removed from the computer system and in the stand-alone state, an internal circuit, such as an MPU, starts to be driven by an output voltage (3V) supplied by the built-in battery, and functions as a stand-alone apparatus, such as an electronic notebook. During this period, the MPU can only access the EEPROM for reading data.

On the other hand, when the PC card is inserted into the computer system and serves as a peripheral device thereof, such as a memory card for the computer system, the interface circuit starts to be driven at an output voltage supplied by the built-in battery in order to perform the interface protocol with the computer system. The computer system can use the normal I/O transfer operation to access the internal register of the interface circuit. The EEPROM is mapped as one part of the memory space in the computer system, for example, and can be accessed by the computer system in accordance with the normal memory access operation. Conveyed across the power line, as the rated output terminal of the computer system, is a voltage (5V) that is high enough to erase and to re-write the EEPROM.

When the computer system and the PC card access the EEPROM to read data, the switching circuit selects the built-in battery as the power source for the EEPROM. Then, an operational voltage (3V) adequate only for reading is supplied to the EEPROM. When the computer system accesses the EEPROM to write data, the switching circuit selects as the power source for the EEPROM the power line across which a high voltage (5V) is supplied. Therefore, the writing operation in the EEPROM is performed.

The selection of the switching circuit may be instructed by the computer system before the writing is instructed. The switching circuit may select a power source, for example, in response to the computer system writing a predetermined value to predetermined bits in the internal register of the interface circuit.

Since the PC card does not itself support a high voltage power supply, the PC card can not access the EEPROM to erase and rewrite data when it is in the stand-alone state. However, so long as the PC card does not need to access the EEPROM for rewriting data, it does not have to support the power supply required for erasing and re-writing.

The other objects, features, and advantages of the present invention will become apparent in due course during the detailed description of the embodiment of the present invention, which will be given while referring to the accompanying drawings.

DESCRIPTION OF THE PREFERRED EMBODIMENTS

The preferred embodiments of the present invention will now be described in detail while referring to the accompanying drawings.

A. Hardware Arrangement of PC card

Figure 1:
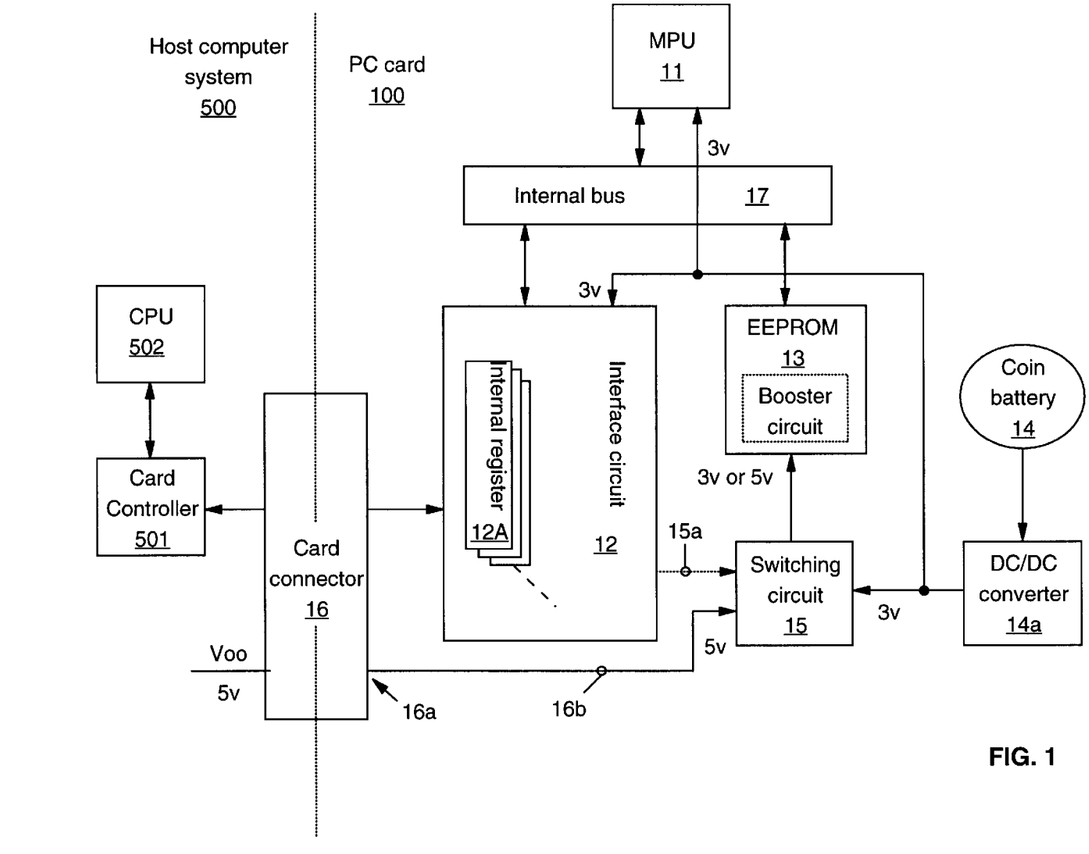
FIG. 1 is a specific diagram illustrating the hardware arrangement for a PC card according to one embodiment of the present invention.

FIG. 1 is a specific diagram illustrating the hardware arrangement of a PC card 100 that embodies the present invention. The PC card 100 comprises an MPU (Micro Processing Unit) 11; an interface circuit 12; an EEPROM 13; a coin battery 14; and a switching circuit 15.

The MPU 11 is a general-purpose processor provided for controlling the internal operation of the PC card 100. The MPU 11, for example, processes a host command transmitted from a host computer system 500 via the interface circuit 12, and accesses the EEPROM 13.

The interface circuit 12 performs the interface protocol with the host computer system 500 into which the PC card 100 is inserted. Some of the external pins of the interface circuit 12 are directly connected to a card connector 16. The card connector 16 is electrically connected to a card controller 501 in the host computer system 500 when it is inserted into the host computer system 500. The card connector 16 includes a connector pin ($V_{CC}$ pin) 16a for the reception of a power voltage $V_{CC}$ of 5V supplied by the host computer system 500. The $V_{CC}$ pin 16a is connected across a power line 16b to the switching circuit 15, which will be described later.

The interface circuit 12 has a plurality of internal registers 12a, such as a control register, a status register and a data register. The MPU 11 and the card controller 501 can access these internal registers 12a. A predetermined bit cell in the internal register 12a communicates electrically with the switching circuit 15 across a signal line 15a, which will be described later.

The EEPROM 13 is a read only memory whose data can be electrically erased and re-written, and is used to permanently store data and programs, which are required for the PC card 100 and the host computer system 500. In the EEPROM 13 are stored, for example, card attribute information (also called "tuples") for the PC card 100 and the firmware that is to be employed by the MPU 10 to operate the PC card 100. Also written in the EEPROM 13 are data (e.g., personal information, such as a schedule and an address list, edited by a PIM (Personal Information Manager)) that have been prepared by the host computer system 500 and that can be referred to when the PC card 100 is carried by a person. The MPU 10 and the card controller 501 can access the EEPROM 13 (it should be noted that the card controller 501 is driven under the control of a CPU 502). The MPU 10 can access the EEPROM 13 to read data only, but can not access it to erase and re-write data. On the other hand, the CPU 502 of the host computer system 500 can access the EEPROM 13 both to read and re-write data.

The EEPROM 13 requires a higher voltage for erasing and re-writing than for reading, as was previously described. The EEPROM 13, therefore, incorporates a booster circuit (indicated by a broken line block). For data reading operation, the EEPROM 13 is driven at a relatively low operational voltage (e.g., 3V) that is supplied by the coin battery 14. For erasing and re-writing operation, the booster circuit raises an relatively high operational voltage (5V), that is supplied by the host computer system 500, to a further higher voltage (12V) at which the EEPROM 13 can be driven.

The MPU 11, the interface circuit 12, and the EEPROM 13 are mutually connected together by an internal bus 17. The internal bus 17 includes a control bus, a data bus, and an address bus.

The coin battery 14 is the main power source for the PC card 100, and its output terminal voltage is 1.4V. The voltage supplied by the coin battery 14 is raised to and stabilized at 3V by an internally mounted DC/DC converter 14a. The voltage is then distributed to the internal circuits in the PC card 100, such as the MPU 11, the interface circuit 12, and the EEPROM 13. It should be noted that the voltage is supplied to the EEPROM 13 via the switching circuit 15.

The switching circuit 15 selects the power to be supplied to the EEPROM 13, either 3V from the coin battery 14 or 5V from the external power source $V_{CC}$. More specifically, the switching circuit 15 conveys the power supplied by the coin battery 14 to the EEPROM 13 during a read access operation, or conveys the power supplied by the external power source $V_{CC}$ to the EEPROM 13 during a write access operation. The read access is performed by both the MPU 11 and the CPU 502, while the write access is performed only by the CPU 502 of the host computer system 500. That is, the erasing and rewriting of the EEPROM 13 can be performed only when the PC card 100 is inserted into the host computer system 500, and is not performed when the PC card 100 is removed from the computer system 500 (in the stand-alone state), as was previously described.

The PC card 100 includes a form factor conforming to the PCMCIA/JEIDA, and it can be inserted into, for example, a PC card slot (not shown) that is provided on the side wall of the host computer system 500. When the PC card 100 is inserted into the card slot (that is, in response to the occurrence of card insertion event), the host computer system 500 performs an enable process with regard to the PC card 100. In the "enable process", the host computer system 500 gives the PC card 100 system resources, such as an I/O address, a DMA level and an IRQ level; maps the memory of the PC card 100, including the EEPROM 13, in the system memory space; and installs an appropriate device driver for operating the PC card 100. The host computer system 500 can perform an I/O access to the enabled PC card 100 and can access to the EEPROM 13.

When the PC card 100 is removed from the card slot (that is, in response to the occurrence of card removal event), the host computer system 500 performs a disable process with regard to the PC card 100. In the "disable process", the host computer system 500 releases the system resources that had been given to the PC card 100. A so-called PnP (plug and play) computer system automatically performs the enable/disable process.

When removed, the PC card 100 can be driven by the coin battery 14. For example, the MPU 11 can read PIM data that have been downloaded from the host computer system 500 to the EEPROM 13.

Hardware components other than those shown in FIG. 1 are required to construct the PC card 100 and the host computer system 500. The PC card 100 may, for example, include an input device (keypad) and a display device (an LCD panel) required for a stand-alone function. These components, however, are not directly related to the subject of the present invention, and will be omitted in the present specification so as to simplify the drawings and explanation.

B. Structure of Switching Circuit

Figure 2:
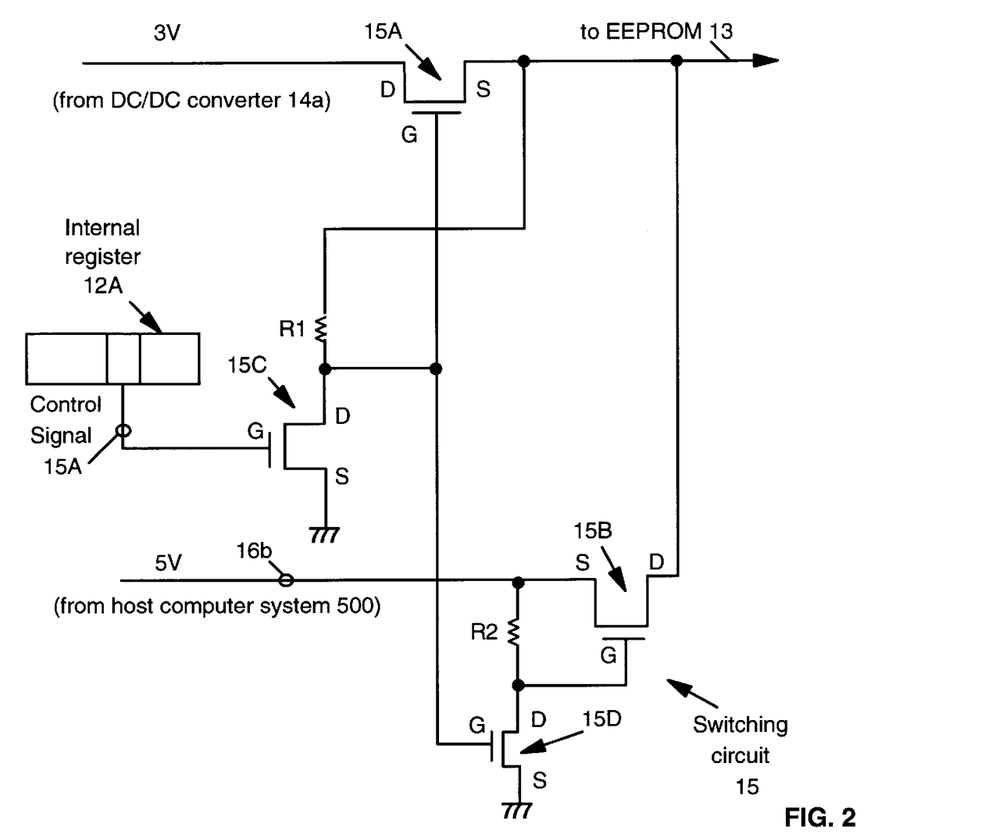
FIG. 2 is a detailed diagram illustrating the internal structure of a switching circuit.

FIG. 2 is a detailed diagram illustrating the internal structure of the switching circuit 15. The switching circuit 15 includes two P-MOS transistors 15A and 15B, and two N-MOS transistor 15C and 15D.

A voltage of 3V is supplied by the coin battery 14 via the DC/DC converter 14a to the drain of the MOS transistor 15A. One end of the control signal line 15a is electrically connected to a predetermined bit cell of one of the internal registers 12a in the interface circuit 12, and the other end is connected to the gate of the MOS transistor 15C. An external voltage of 5V is supplied across the power line 16b to the source of the MOS transistor 15B.

The source of the MOS transistor 15A and the drain of the MOS transistor 15B are connected in parallel and their output is forwarded to the EEPROM 13 as the output of the switching circuit 15.

The source of the MOS transistor 15C is grounded. The drain of the MOS transistor 15C is connected to the gates of the MOS transistors 15A and 15D, and is connected across a resistor R1 to the source of the MOS transistor 15A.

The source of the MOS transistor 15D is grounded. The drain of the MOS transistor 15D is connected to the gate of the MOS transistor 15B and is connected across a resistor R2 to the source of the MOS transistor 15B.

EEPROM Read Access:

To access the EEPROM 13 for reading data, first, the host computer system 500 performs an I/O access to an internal register 12a and writes a value of "1" in a predetermined bit cell, which will be described later.

With this event, a high-level signal is transmitted to the gate of the MOS transistor 15C across the control signal line 15a, and the N-channel MOS transistor 15C is rendered on. In response to this, the gates of the MOS transistors 15A and 15D are pulled down to ground level, i.e., go low.

Since the N-channel MOS transistor 15D is rendered off, a voltage from the external power source $V_{CC}$ is supplied across the resistor R2 to the gate of the P-channel MOS transistor 15B, which is then rendered off. As a result, the external power source $V_{CC}$ is disconnected from the output terminal of the switching circuit 15.

The P-channel MOS transistor 15A is rendered on. Accordingly, the output of the DC/DC converter 14a is directly transmitted to the output terminal of the switching circuit 15, and a voltage of 3V is supplied to the EEPROM 13.

EEPROM Erase and Re-write Access:

To access the EEPROM 13 to erase and rewrite data, first, the host computer system 500 performs an I/O access to the internal register 12a and writes a value of "0" in a predetermined bit cell, which will be described later.

At this time, a low-level signal is transmitted to the gate of the MOS transistor 15C across the control signal line 15a, and the N-channel MOS transistor 15C is rendered off.

Since, at the moment the MOS transistor 15C is disconnected from the ground, output terminal voltage of 3V supplied by the switching circuit 15 is maintained at the drain, the gates of the MOS transistors 15A and 15D go high momentarily. Accordingly, the MOS transistor 15A is rendered off, and the DC/DC converter 14a is disconnected from the output terminal of the switching circuit 15. The MOS transistor 15D is rendered on.

When the MOS transistor 15D is on, the gate of the MOS transistor 15B is pulled down to ground level, i.e., a low-level signal is transmitted to the gate. Accordingly, the P-channel MOS transistor 15B is rendered on, the external power source voltage $V_{CC}$ is connected to the output terminal of the switching circuit 15, and a voltage of 5V is supplied to the EEPROM 13.

C. EEPROM Reading/Writing Operation

The hardware arrangement of the PC card 100 of the present invention has been described in the above sub-divisions. In this sub-division, the processing of the present invention will be explained by employing a reading and writing operation, as an example, that the host computer system 500 performs with the EEPROM 13 in the PC card 100.

Figure 3:
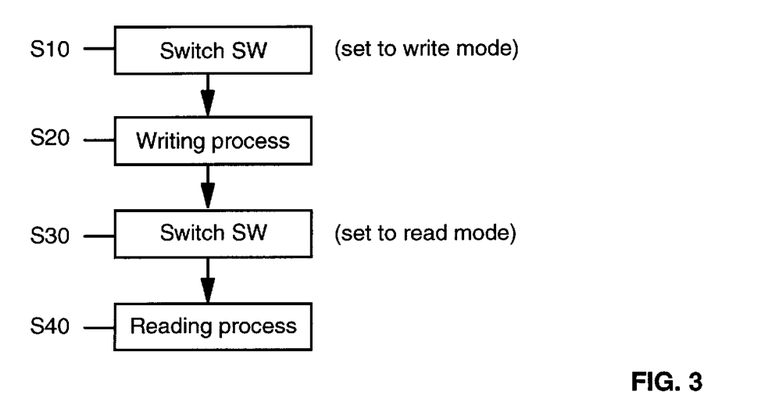
FIG. 3 is a flowchart showing the power source switching operation of the PC card.

FIG. 3 is a schematic flowchart illustrating the reading/writing operation of the EEPROM 13.

EEPROM Writing Operation:

To access the EEPROM 13 to write data, first, the host computer system 500 performs an I/O access to the internal register 12a of the interface circuit 12 and writes a value of "0" in a predetermined bit cell. It should be noted that I/O access is not required when a value of "0" is already set in the bit cell.

The predetermined bit cell is electrically connected to the switching circuit 15 across the control signal line 15a. In response to the setting of the value "0", the switching circuit 15 switches the power source for the EEPROM 13 to the external power source $V_{CC}$ of 5V, as was previously described. Accordingly, the booster circuit in the EEPROM 13 becomes active and supplies an operational voltage of 12V that enables erasing and rewriting operation. In this manner, the PC card 100 enters a "write mode" (step S10).

In the write mode, the host computer system 500 can access the EEPROM 13 in the ordinary memory access manner, and writes data at a desired address (step S20).

EEPROM Reading operation:

To access the EEPROM 13 to read data, first, the host computer system 500 performs an I/O access to the internal register 12a of the interface circuit 12 and writes a value of "1" in a predetermined bit cell. It should be noted that I/O access is not required when a value of "1" is already set in the bit cell.

The predetermined bit cell is electrically connected to the switching circuit 15 across the control signal line 15a. In response to the setting of the value "1", the switching circuit 15 switches the power source for the EEPROM 13 to the coin battery 14, as was previously described, so as to output 3V. Accordingly, the booster circuit in the EEPROM 13 becomes inactive and supplies an operational voltage of 3V that only enables reading operation. In this manner, the PC card 100 enters a "read mode" (step S30).

In the read mode, the host computer system 500 can access the EEPROM 13 in the ordinary memory access manner, and reads data from a desired address (step S40).

When the PC card 100 is removed from the host computer system 500 and is used as a stand-alone apparatus, the PC card 100 is always set in the read mode, and only a voltage of 3V is supplied to the EEPROM 13.

D. Hardware Arrangement for Another Example PC Card

Figure 4:
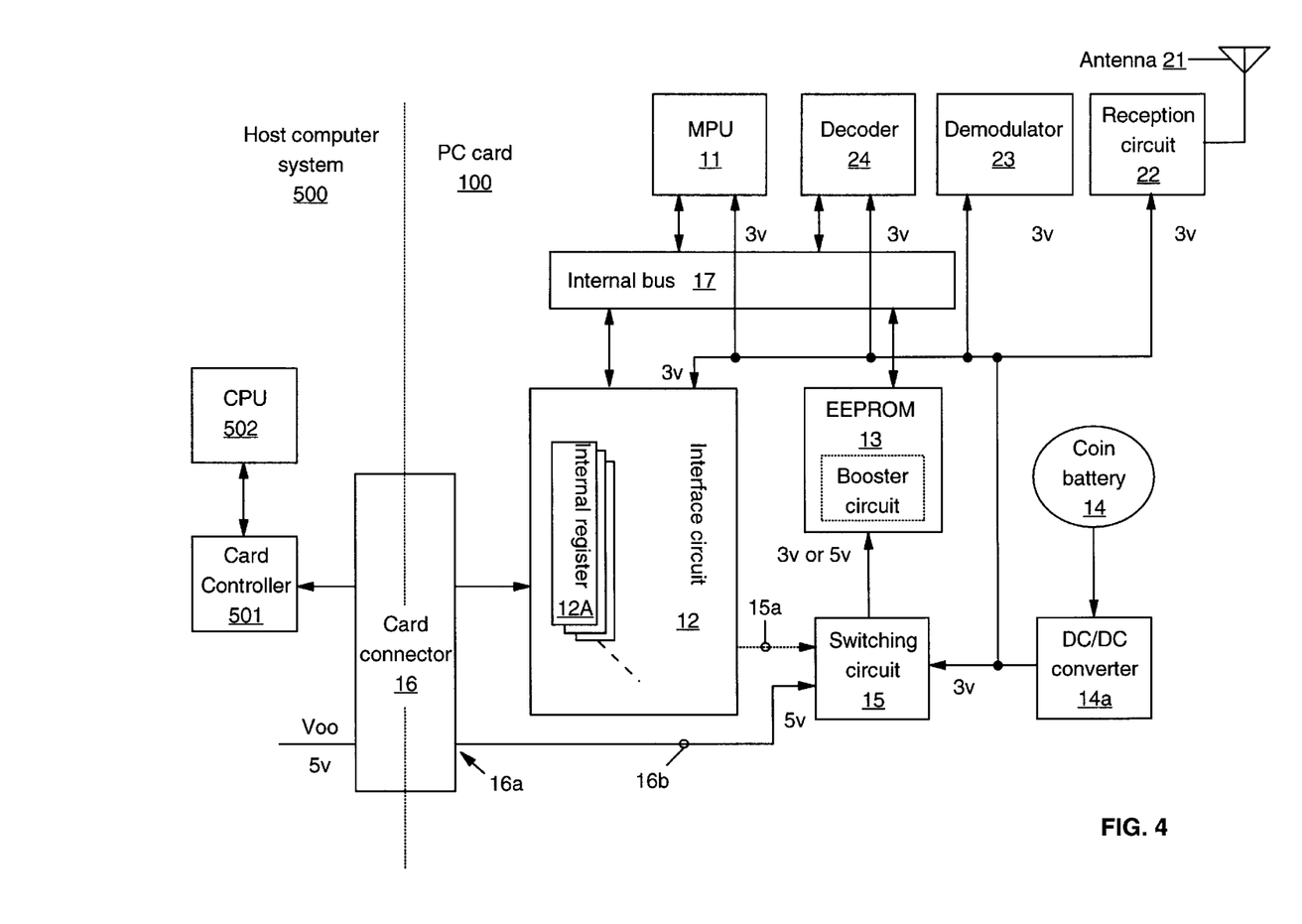
FIG. 4 is a specific diagram illustrating the hardware arrangement for a PC card 200 according to another embodiment of the present invention.

FIG. 4 is a specific diagram illustrating the hardware arrangement of a PC card 200 according to another embodiment for the present invention.

The primary difference between the PC card 200 and the PC card 100 in FIG. 1 is that the PC card 200 has reception (pager) functions, such as an antenna 21 for reception, a reception circuit 22, a demodulator 23 and a decoder 24. These additional circuits 22, 23 and 24 are composed of analog circuits, and are designed to be driven at 3V, as are the digital circuits, such as the MPU 11 and the interface circuits 12. The circuits 22, 23 and 24 are powered by the coin battery 14 both when the PC card 200 is in the stand-alone state and is inserted into the host computer system 500.

The PC card 200 having the reception functions can receive, by radio, data from another apparatus, when the PC card 200 either is in the stand-alone state or is inserted into the host computer system 500.

The special feature of the PC card 200 is that power is constantly supplied to the analog circuits 22, 23 and 24 by the coin battery 14, regardless of whether or not the PC card 200 is inserted into the host computer system 500. Power can be supplied externally to the analog circuits 22, 23 and 24 via the power ($V_{CC}$) pin 16a. However, since the host computer system 500 includes many other hardware components, the power supply $V_{CC}$ must be shared with the other hardware components. As the work loads of the individual hardware components in the computer system 500 are not uniform and dynamically vary with time, the power voltage $V_{CC}$ is less stable. As is well known to one having ordinary skill in the art, analog circuits are considerably more susceptible to noise than are digital circuits. In other words, fluctuation of the external voltage $V_{CC}$ will cause noise in the analog circuits 22, 23 and 24. On the other hand, in this embodiment, the coin battery 14 is shared with only a few digital circuits 11 and 12. The output voltage level, therefore, is extremely stable and no noise is produced.

The operational characteristics of the switching circuit 15 and the other features are almost the same as those for the PC card 100, and no explanation for them will be given in this sub-division.

The present invention has been described in detail while referring to a specific embodiment. However, it should be obvious to one having ordinary skill in the art that various modifications or revisions of the embodiment are possible within the scope of the present invention. A PC card has been employed to explain the embodiments, but the present invention can be applied to other types of peripheral devices that incorporate EEPROMs. That is, although the present invention has been disclosed by using an example, it should not be limited to that example. To fully understand the subject of the present invention, the claims should be referred to.

As is described above in detail, according to the present invention, provided is an excellent PC card and peripheral device that can be inserted into an host computer system and that can also function as a stand-alone apparatus by employing a built-in battery.

In addition, according to the present invention, provided is an excellent PC card and peripheral device having a non-volatile memory device that can perform erasing and re-writing at a relatively high operational voltage, and an internal circuit that is driven at a relatively low voltage.

What is claimed:

1. A stand-alone PC card connectable to a host computer system, comprising:

(a) a non-volatile memory device that can be read at a first operational voltage and that can be read, erased and re-written at a second operational voltage higher than the first operational voltage;

(b) a built-in voltage source for providing the first operational voltage;

(c) a connector for connecting the PC card to the host computer system, including a power connection to receive the second operational voltage from the host computer system; and (d) a switching circuit for connecting either the built-in voltage source to provide the first operational voltage for reading the non-volatile memory device or a power connection to the connector to provide the second operational voltage from the host computer system to access the non-volatile memory device in response to a read access or an erase/re-write access.

2. The stand-alone PC card, as defined in claim 1, wherein the built-in voltage source is a battery.

3. The stand-alone PC card, as defined in claim 2, further including an internal circuit that is driven at the first operational voltage provided by the built-in battery.

4. A stand-alone PC card connectable to a host computer system, comprising:

(a) a non-volatile memory device that can be read at a first operational voltage and can be read, erased and re-written at a second operational voltage higher than the first operational voltage;

(b) a built-in battery for providing the first operational voltage;

(c) a connector for connecting the PC card to the host computer system, including a power connection to receive the second operational voltage from the host computer system;

(d) an MPU for controlling the internal operation of the PC card, the MPU being driven at the first operational voltage provided by the built-in battery; and (e) a switching circuit for connecting either an output terminal of the built-in battery to provide the first operational voltage for reading the non-volatile memory device or a power line to the connector to provide to the non-volatile memory device the second operational voltage from the host computer system in response to a read access or an erase/re-write access.

5. The stand-alone PC card, as defined in claim 4, further including an interface circuit for performing an interface protocol with the host computer system, the interface circuit being driven at the first operational voltage supplied by the built-in battery.

6. A PC card insertable into a host computer system, comprising:
(a) a non-volatile memory device that can be read at a first operational voltage and can be erased and re-written at a second operational voltage higher than the first operational voltage;
(b) a built-in battery for providing the first operational voltage;
(c) a connector for connecting the PC card to the host computer system, including a power connection to receive the second operational voltage from the host computer system;
(d) an MPU for controlling the internal operation of the PC card, the MPU being driven at the first operational voltage supplied by the built-in battery;
(e) an interface circuit that is driven at the first operational voltage supplied by the built-in battery, including an internal register to which I/O access by the host computer system is enabled; and
(f) a switching circuit for connecting either an output terminal of the built-in battery to provide the first operational voltage for reading the non-volatile memory device or a power line to the connector to provide to the non-volatile memory device the second operational voltage from the host computer system in accordance with a set value for predetermined bits in the internal register.

7. A PC card insertable into a host computer system, comprising:
(a) a non-volatile memory device that can be read at a first operational voltage and can be erased and re-written at a second operational voltage higher than the first operational voltage;
(b) a built-in battery for providing the first operational voltage;
(c) a connector for connecting the PC card to the host computer system, including a power connection to receive the second operational voltage from the host computer system;
(d) an MPU for controlling the internal operation of the PC card, the MPU being driven at the first operational voltage supplied by the built-in battery;
(e) an interface circuit for performing an interface protocol with the host computer system, the interface circuit being driven at the first operational voltage supplied by the built-in battery;
(f) a switching circuit for connecting either an output terminal of the built-in battery to provide the first operational voltage for reading the non-volatile memory device or a power line to the connector to provide to the non-volatile memory device the second operational voltage from the host computer system; and
(g) instruction means for providing an instruction to specify whether reading or writing to the non-volatile memory device is currently performed; and
(h) switching means for operating the switching circuit in accordance with an instruction received from the instruction means.

8. A PC card insertable into a host computer system, comprising:
(a) a non-volatile memory device that can be read at a first operational voltage and can be erased and re-written at a second operational voltage higher than the first operational voltage;
(b) a built-in battery for providing the first operational voltage;
(c) a connector for connecting the PC card to the host computer system, including a power connection to receive the second operational voltage from the host computer system;
(d) an internal circuit that is driven at the first operational voltage supplied by the built-in battery; and
(e) a switching circuit for connecting either an output for the built-in battery to provide the first operational voltage for accessing the non-volatile memory device or a power connection to the connector to provide to the second operational voltage for accessing the non-volatile memory device in response to a read access or an erase/re-write access.

9. A PC card, which can be inserted into a host computer system, comprising:
(a) a non-volatile memory device that can be read at a first operational voltage and that can be erased and re-written at a second operational voltage higher than the first operational voltage;
(b) a built-in battery for providing the first operational voltage;
(c) a connector for connecting the PC card to the host computer system, including a power connection to receive the second operational voltage from the host computer system;
(d) a digital MPU for controlling the internal operation of the PC card, the digital MPU being driven at the first operational voltage supplied by the built-in battery;
(e) a digital interface circuit for performing an interface protocol with the host computer system, the digital interface circuit being driven at the first operational voltage supplied by the built-in battery;
(f) an analog reception circuit for performing radio communication with an external apparatus other than the host computer system, the analog reception circuit being driven at the first operational voltage supplied by the built-in battery; and
(g) a switching circuit for connecting either an output connection from the built-in battery or a power connection from the second operational voltage from the host computer system to the connector to provide to the non-volatile memory device in response to a read access or an erase and a write access.

10. A peripheral device, which can be inserted into a host computer system, comprising:
(a) a non-volatile memory device that can be read at a first operational voltage and that can be erased and re-written at a second operational voltage higher than the first operational voltage;
(b) a built-in battery for providing the first operational voltage;
(c) a connector for connecting the PC card to the host computer system, including a power connection to receive the second operational voltage from the host computer system;
(d) an internal circuit that is driven at the first operational voltage provided by the built-in battery; and
(e) a switching circuit for connecting either an output terminal of the built-in battery or a power line of the connector with the second operational voltage from the host computer system to provide to the non-volatile memory device in response to a read access or an erase/re-write access.

11. A peripheral device insertable into a host computer system, comprising:
(a) a non-volatile memory device that can be read at a first operational voltage and can be erased and re-written at a second operational voltage higher than the first operational voltage;
(b) a built-in battery for providing the first operational voltage;
(c) a connector for connecting the PC card to the host computer system, including a power connection to receive the second operational voltage from the host computer system;
(d) an MPU for controlling the internal operation of the peripheral device, the the MPU being driven at the first operational voltage provided by the built-in battery;
(e) an interface circuit for performing an interface protocol with the host computer system, the interface circuit being driven at the first operational voltage supplied by the built-in battery; and
(f) a switching circuit for connecting either an output terminal of the built-in battery or a power line to the connector to provide the second operational voltage form the host computer system for accessing the non-volatile memory device in response to a read access or an erase/re-write access.

12. A peripheral device insertable into a host computer system, comprising:
(a) a non-volatile memory device that can be read at a first operational voltage and can be erased and re-written at a second operational voltage higher than the first operational voltage;
(b) a built-in battery for providing the first operational voltage;
(c) a connector for connecting the PC card to the host computer system, including a power connection to receive the second operational voltage from the host computer system;
(d) an MPU for controlling the internal operation of the peripheral device, the MPU being driven at the first operational voltage supplied by the built-in battery;
(e) an interface circuit that is driven at the first operational voltage supplied by the built-in battery, including an internal register to which I/O access by the host computer system is enabled; and
(f) a switching circuit for connecting either an output terminal of the built-in battery to provide the first operational voltage for reading the non-volatile memory device or a power line to the connector to provide the second operational voltage from the host computer system for accessing the non-volatile memory device in accordance with a set value for predetermined bits in the internal register.

13. A peripheral device insertable into a host computer system, comprising:
(a) a non-volatile memory device that can be read at a first operational voltage and can be erased and re-written at a second operational voltage higher than the first operational voltage;
(b) a built-in battery for providing the first operational voltage;
(c) a connector for connecting the PC card to the host computer system, including a power connection to receive the second operational voltage from the host computer system;
(d) an MPU for controlling the internal operation of the peripheral device, the MPU being driven at the first operational voltage supplied by the built-in battery;
(e) an interface circuit for performing an interface protocol with the host computer system, the interface circuit being driven at the first operational voltage supplied by the built-in battery;
(f) a switching circuit for connecting either an output terminal of the built-in battery to provide the first operational voltage for accessing the non-volatile memory device or a power line to the connector to provide the second operational voltage from the host computer system for accessing the non-volatile memory device;
(g) instruction means for specifying whether reading or writing to the non-volatile memory device is currently performed; and
(h) switching means for operating the switching circuit in accordance with an instruction received from the instruction means.

14. A peripheral device insertable into a host computer system, comprising:
(a) a non-volatile memory device that can be read at a first operational voltage and can be erased and re-written at a second operational voltage higher than the first operational voltage;
(b) a built-in battery for providing the first operational voltage;
(c) a connector for connecting the PC card to the host computer system, including a power connection to receive the second operational voltage from the host computer system;
(d) an internal digital circuit that is driven at the first operational voltage supplied by the built-in battery;
(e) an internal analog circuit that is driven at the first operational voltage supplied by the built-in battery; and
(f) a switching circuit for connecting either an output line for the built-in battery or a power line to the connector to provide the second operational voltage from the host computer system for accessing the non-volatile memory device in response to a read access or an erase/re-write access.

15. A peripheral device, which can be inserted into a host computer system, comprising:
(a) a non-volatile memory device that can be read at a first operational voltage and that can be erased and re-written at a second operational voltage higher than the first operational voltage;
(b) a built-in battery for providing the first operational voltage;
(c) a connector for connecting the PC card to the host computer system, including a power connection to receive the second operational voltage from the host computer system;
(d) a digital MPU for controlling the internal operation of the peripheral device, the digital MPU being driven at the first operational voltage supplied by the built-in battery device;

(e) a digital interface circuit for performing an interface protocol with the host computer system, the digital interface circuit being driven at the first operational voltage supplied by the built-in battery;

(f) an analog reception circuit for performing radio communication with an external apparatus other than the host computer system, the analog reception circuit being driven at the first operational voltage supplied by the built-in battery; and (g) a switching circuit for connecting either an output line for the built-in battery or a power line to the connector to provide the second operational voltage from the host computer system for accessing the non-volatile memory device in response to a read access or an erase/re-write access.

\* \* \* \* \*